(12) United States Patent  (10) Patent No.: US 8,023,139 B2
Sakai                      (45) Date of Patent: Sep. 20, 2011

(54) IMAGE PROCESSING APPARATUS, METHOD OF CONTROLLING IMAGE PROCESSING APPARATUS, AND PROGRAM

(75) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/664,821

(22) PCT Filed: Jun. 16, 2008

(86) PCT No.: PCT/JP2008/061368
§ 371 (c)(1),
(2), (4) Date: Dec. 15, 2009

(87) PCT Pub. No.: WO2008/156179
PCT Pub. Date: Dec. 24, 2008

(65) Prior Publication Data
US 2010/0182639 A1    Jul. 22, 2010

(30) Foreign Application Priority Data
Jun. 18, 2007  (JP) .................................. 2007-160217

(51) Int. Cl.
*G06F 15/00* (2006.01)
*G06F 11/30* (2006.01)
(52) U.S. Cl. ...................................... 358/1.15; 713/193
(58) Field of Classification Search .................. 358/1.15, 358/1.14, 1.13, 1.16, 1.18, 1.9, 3.24, 3.28, 358/2.1, 2.99; 370/392, 473, 230, 476, 474; 347/5, 13, 15, 19, 49; 382/100, 276, 293; 713/189, 167, 193
See application file for complete search history.

(56) References Cited

U.S. PATENT DOCUMENTS
2001/0038462 A1* 11/2001 Teeuwen et al. ............. 358/1.15
2003/0167336 A1*  9/2003 Iwamoto et al. ............. 709/229

FOREIGN PATENT DOCUMENTS
JP  2003-330668 A  11/2003
JP  2006-167928 A   6/2006
JP  2006-344185 A  12/2006
JP  2007-094674 A   4/2007

* cited by examiner

*Primary Examiner* — Saeid Ebrahimi Dehkordy
(74) *Attorney, Agent, or Firm* — Canon U.S.A., Inc., IP Division

(57) ABSTRACT

An image processing apparatus for transmitting input image data to another image processing apparatus and causing the other image processing apparatus to process the image data. The image processing apparatus transmits a request to acquire first restriction information about a user in using the image processing apparatus in accordance with input of authentication information to specify the user. A request to acquire second restriction information about the user in using the other image processing apparatus is transmitted in accordance with the input. The user's login to the image processing apparatus is completed in accordance with acquisition of the first restriction information regardless of acquisition of the second restriction information.

9 Claims, 16 Drawing Sheets

HOLD UP CARD OVER CARD READER

FIG. 16

|  |  |  | USER A | USER B |
|---|---|---|---|---|
| IMAGE PROCESSING APPARATUS A | | | ○ | ○ |
| | COPY | | ○ | ○ |
| | | COLOR | ○ | — |
| | | DOUBLE-SIDED | ○ | — |
| | | STAPLE | — | — |
| | TRANSMISSION | | ○ | ○ |
| | | FAX | ○ | ○ |
| | | E-MAIL | — | — |
| IMAGE PROCESSING APPARATUS B | | | ○ | — |
| | COPY | | ○ | — |
| | | COLOR | ○ | — |
| | | DOUBLE-SIDED | ○ | — |
| | | STAPLE | ○ | — |
| | TRANSMISSION | | — | — |
| | | FAX | — | — |
| | | E-MAIL | — | — |
| IMAGE PROCESSING APPARATUS C | | | | |
| ... | | | | |

1601: USER A column
1602: USER B column
1603: IMAGE PROCESSING APPARATUS A section
1604: IMAGE PROCESSING APPARATUS B section

IMAGE PROCESSING APPARATUS, METHOD OF CONTROLLING IMAGE PROCESSING APPARATUS, AND PROGRAM

TECHNICAL FIELD

The present invention relates to an image processing apparatus which is connected to another image processing apparatus and can execute processing in cooperation with the other image processing apparatus.

BACKGROUND ART

An image processing apparatus such as a printer or a multifunction peripheral installed in an office or the like is used by a plurality of users. The image processing apparatus to be used by a plurality of users provides various functions, and it is possible to restrict usable functions for each user of the image processing apparatus. In this case, the image processing apparatus authenticates a user who has logged in to it and specifies functions usable by the user. Such an image processing apparatus can restrict, for example, use of color printing for a certain user and restrict use of the FAX function for another user.

On the other hand, an image processing system is recently used in which a plurality of image processing apparatuses connected to a network execute one job cooperatively. For example, a scanner connected to a network reads image data and transmits it to a printer on the network so that the printer can print it. In this case, the scanner and printer connected to the network execute one copy job cooperatively.

Japanese Patent Laid-Open No. 2003-330668 describes a technique of causing a host computer to which a user has logged in to determine his/her authority for use of each of a plurality of image processing apparatuses on a network and present usable image processing apparatuses and usable functions to him/her.

When a user is going to log in to one of the image processing apparatuses on the network, the method of Japanese Patent Laid-Open No. 2003-330668 poses the following problem. That is, the user needs a long time until log in to a specific image processing apparatus because the method of Japanese Patent Laid-Open No. 2003-330668 allows log in after acquiring the user restriction information of the remaining image processing apparatuses on the network. If the number of image processing apparatuses on the network increases, the information amount to be processed increases, and the problem becomes more serious.

To solve this problem, the following method is usable. In logging in to a specific image processing apparatus, the restriction of use information of only that image processing apparatus is acquired. To use another image processing apparatus for the above-described cooperative processing, the restriction of use information of the other image processing apparatus is acquired each time. In this method, however, every time the user uses another image processing apparatus, there is a wait time. This degrades the usability for the user in using another image processing apparatus.

DISCLOSURE OF INVENTION

The present invention has been made to solve the problems of the prior art, and has as its object to shorten the wait time and improve the operability when a user is going to log in to an image processing apparatus in a system including a plurality of image processing apparatuses connected.

One aspect of the present invention provides an image processing apparatus for transmitting input image data to another image processing apparatus and causing the other image processing apparatus to process the image data, comprising: an input unit configured to input authentication information to specify a user; a first transmission unit configured to transmit a request to acquire first restriction information about the user in using the image processing apparatus in accordance with input by the input unit; a second transmission unit configured to transmit a request to acquire second restriction information about the user in using the other image processing apparatus in accordance with input by the input unit; and a control unit configured to complete login of the user to the image processing apparatus in accordance with acquisition of the first restriction information regardless of acquisition of the second restriction information.

Another aspect of the present invention provides a method of controlling an image processing apparatus for transmitting input image data to another image processing apparatus and causing the other image processing apparatus to process the image data, comprising: an input step of inputting authentication information to specify a user; a first transmission step of transmitting a request to acquire first restriction information about the user in using the image processing apparatus in accordance with input in the input step; a second transmission step of transmitting a request to acquire second restriction information about the user in using the other image processing apparatus in accordance with input in the input step; and a control step of completing login of the user to the image processing apparatus in accordance with acquisition of the first restriction information regardless of acquisition of the second restriction information.

Still another aspect of the present invention provides a computer-readable storage medium storing a computer program characterized by causing an image processing apparatus for transmitting input image data to another image processing apparatus and causing the other image processing apparatus to process the image data to execute: an input step of inputting authentication information to specify a user; a first transmission step of transmitting a request to acquire first restriction information about the user in using the image processing apparatus in accordance with input in the input step; a second transmission step of transmitting a request to acquire second restriction information about the user in using the other image processing apparatus in accordance with input in the input step; and a control step of completing login of the user to the image processing apparatus in accordance with acquisition of the first restriction information regardless of acquisition of the second restriction information.

Other features, objects and advantages of the present invention will be apparent from the following description when taken in conjunction with the accompanying drawings, in which like reference characters designate the same or similar parts throughout the figures thereof.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 16 is a view showing an example of the restriction of use information database of the information processing apparatus according to the embodiment.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
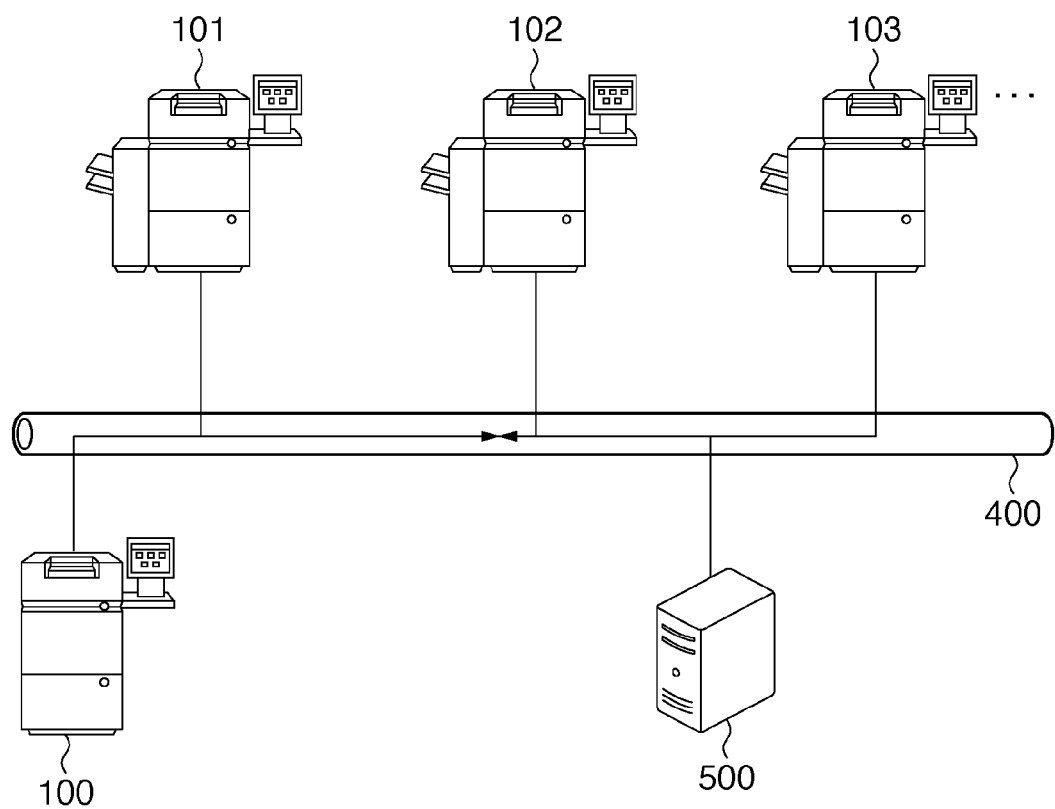
FIG. 1 is a view showing an example of the arrangement of a system according to the embodiment.

The arrangement of a system according to this embodiment will be described first with reference to FIG. 1. In the system shown in FIG. 1, a plurality of image processing apparatuses 100, 101, 102, and 103 and an information processing apparatus 500 are connected to a network 400.

Each of the image processing apparatuses 100 to 103 has at least one of image processing functions such as a scan function, print function, copy function, storage function, transmitting function, and FAX function. The image processing apparatuses 100 to 103 can execute a process in cooperation with each other. For example, the image processing apparatus 100 scans image data and transmits it to the image processing apparatus 101, and the image processing apparatus 101 prints the image data. That is, the image processing apparatuses 100 and 101 can cooperatively execute a copy process. Alternatively, the image processing apparatus 100 scans image data and transmits it to the image processing apparatus 102, and the image processing apparatus 102 externally transmits the image data by FAX. In this case, even when the image processing apparatus 100 has no FAX function, the user can externally transmit the data by FAX by operating the image processing apparatus 100. In this embodiment, an explanation will be made assuming that the user uses the image processing apparatus 100, 101, 102, or 103 by directly operating the image processing apparatus 100. In this embodiment, the image processing apparatus 100 directly operated by the user will be referred to as a local device. The image processing apparatuses 101 to 103 which are not directly operated by the user but sometimes execute a process in response to a request from the image processing apparatus 100 will be referred to as remote devices. For the descriptive convenience, the image processing apparatus 100 is defined as a local device, and the image processing apparatuses 101 to 103 are defined as remote devices. However, each image processing apparatus can serve as either of the local device and remote device.

The information processing apparatus 500 serves as an authentication server which executes user authentication or manages the restriction of use of each image processing apparatus for each user. The restriction of use of an image processing apparatus indicates whether a user can use the image processing apparatus or which function of the image processing apparatus is usable. The information processing apparatus 500 holds restriction of use information (restriction information) that describes the restriction of use for each user. Examples of the restriction of use target functions of an image processing apparatus are the scan function, print function, copy function, storage function, transmitting function, and FAX function. It is also possible to manage information representing whether more specific settings of each functions (e.g., staple setting, color print setting, double-sided print setting, reduced layout setting, and paper size setting of the copy function) are usable. For example, the information processing apparatus 500 manages usable image processing apparatuses as the restriction of use for a user A. If usable image processing apparatuses exist, the usable functions (or unusable function) of each image processing apparatus are managed. The information processing apparatus 500 executes user authentication in response to a login request from the user and transmits the restriction of use information under management. In this embodiment, a single server executes user authentication and restriction of use management. These may be executed by separate servers. Alternatively, one of the image processing apparatuses 100 to 103 may have the user authentication function or the restriction of use management function. The functions described above as the restriction of use management target are merely examples, and the present invention is not limited to them.

The network 400 can be either a wired network such as a LAN, WAN, or Internet, or a wireless network such as a wireless LAN or Bluetooth.

An example of the arrangement of the image processing apparatuses 100 to 103 will be described next with reference to FIG. 2.

A reader unit 200 optically reads a original image and converts it into image data. The reader unit 200 includes a scanner unit 210 having a function of reading a document, and a original feeder unit 250 having a function of conveying a document sheet. The original feeder unit 250 may be absent in some device arrangements (in this case, a document is placed on a pressing plate so-called platen glass and read using a sensor). A printer unit 300 conveys a print paper sheet, prints the image data on it as a visible image, and discharges the paper sheet outside the apparatus. The printer unit 300 includes a feeding unit 360 having a plurality of kinds of print paper cassettes, a marking unit 310 which transfers and fixes image data on a print paper sheet, and a discharge unit 370 which sorts and staples printed print paper sheets and outputs them outside the apparatus. A control device 110 is electrically connected to the reader unit 200 and the printer unit 300 and also connected to the network 400. The control device 110 controls the reader unit 200 to read the image data of a document and controls the printer unit 300 to print the image data on a print paper sheet and output it, thereby providing a copy function. The control device 110 also provides a network scanner function of converting image data read by the reader unit 200 into code data and transmitting it to a host computer via the network 400. The control device 110 also provides a printer function of converting code data received from a host computer via the LAN 400 into image data and outputting it to the printer unit 300. An operation unit 150 having a liquid crystal display unit, a touch panel input device bonded onto the liquid crystal display unit, and a plurality of hard keys provides a user I/F which allows a user to perform various operations. A signal input from the touch panel or hard key is transmitted to the control device 110. The liquid crystal display unit displays image data transmitted from the control device 110. In user authentication using an IC card or the like, a card reader 155 acquires authentication information from the card. The information read out from the card is transmitted to the control device 110. The control device 110 controls to transmit the information to the information processing apparatus 500 via the network 400 and request authentication so that only an authenticate user can use functions. The control device 110 also controls to inquire of the information processing apparatus 500 about the restriction of use information about a user at the time of authentication and cause the user to use only functions within the range of the restriction of use. Note that the input means for inputting authentication information is not limited to the card reader 155. The user may manually input via the operation unit 150, or any other method is usable.

Figure 2:
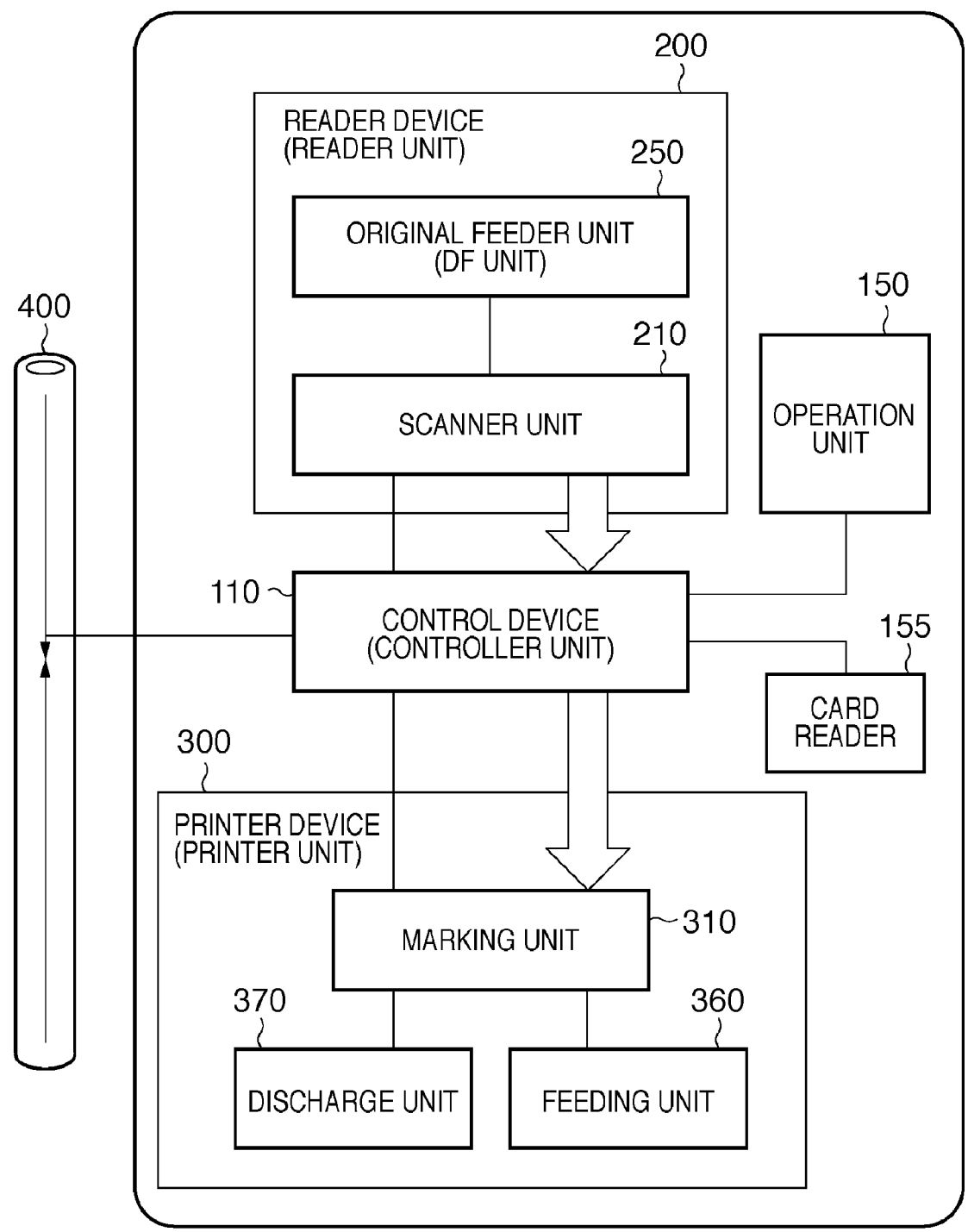
FIG. 2 is a block diagram showing an example of the structure of an image processing apparatus according to the embodiment.
Figure 3:
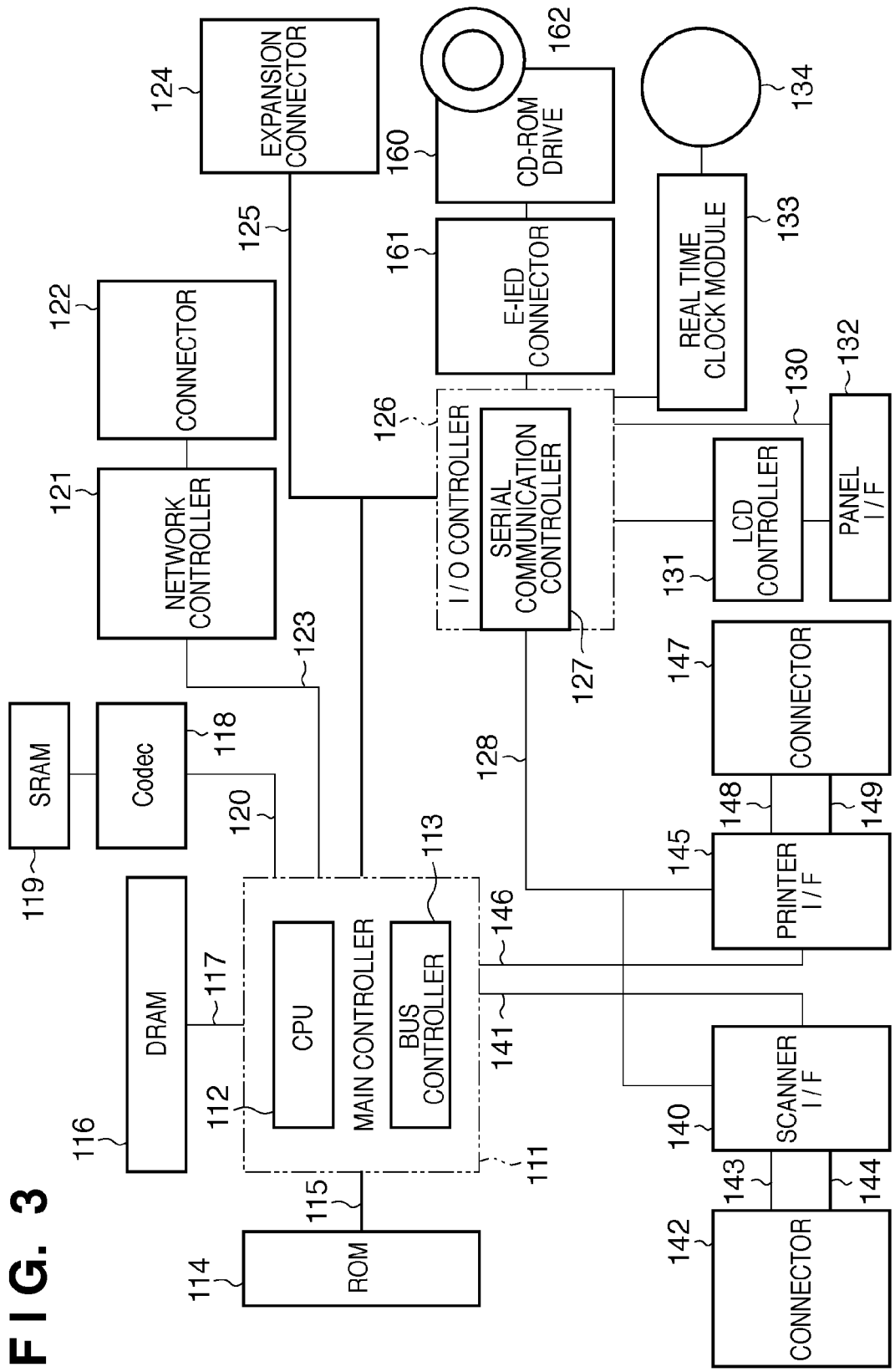
FIG. 3 is a block diagram showing the circuit arrangement of the control device of the image processing apparatus according to the embodiment.

FIG. 3 is a block diagram showing the circuit arrangement of the control device 110 shown in FIG. 2. The control device 110 includes a main controller 111, ROM 114, DRAM 116, Codec 118, SRAM 119, network controller 121, connector 122, and expansion connector 124. The control device 110 also includes an I/O controller 126, LCD controller 131, panel I/F 132, real time clock module 133, scanner I/F 140, connector 142, printer I/F 145, connector 147, and E-IDE connector 161. Referring to FIG. 3, reference numeral 134 denotes a backup battery; 160, a CD-ROM drive; and 162, a CD-ROM.

The arrangement of each unit will be described in detail. The main controller 111 mainly includes a CPU 112, bus controller 113, and various kinds of I/F controllers. The CPU 112 and the bus controller 113 control the overall operation of the control device 110. The CPU 112 operates based on a program read out from the ROM 114 via a ROM I/F 115. An operation of interrupting PDL (Page Description Language) code data received from a host computer and rasterizing it to raster image data is also described in the program and processed by software. The bus controller 113 controls transfer of data input/output to/from each I/F. The bus controller 113 arbitrates bus conflict and controls DMA (Direct Memory Access) data transfer. The CPU 112 of the main controller 111 executes processes illustrated by the flowcharts in FIGS. 8 to 14 to be described later.

The DRAM 116 is connected to the main controller 111 via a DRAM I/F 117 and used as a work area for the operation of the CPU 112 or an area for storing image data. The Codec 118 compresses raster image data stored in the DRAM 116 by MH/MR/MMR/JBIG, or conversely decompresses compressed and stored code data to raster image data. The SRAM 119 serves as the temporary work area of the Codec 118. The Codec 118 is connected to the main controller 111 via an I/F 120. The bus controller 113 controls data transfer between the Codec 118 and the DRAM 116 so that data is DAM-transferred.

The network controller 121 is connected to the main controller 111 via an I/F 123 and to an external network via a connector 122. An expansion connector 124 to connect an expansion board, and an I/O controller 126 are connected to a general high-speed bus 125. A typical example of the general high-speed bus 125 is a PCI bus.

The I/O controller 126 includes two channels of an asynchronous serial communication controller 127 for transmitting/receiving a control command to/from the CPU of each of the reader unit 200 and the printer unit 300. The asynchronous serial communication controller 127 is connected to the external I/F circuits (scanner I/F and printer I/F) 140 and 145 via an I/O bus 128. The panel I/F 132 is connected to the LCD controller 131 and includes an I/F for performing display on the liquid crystal window of the operation unit 150 and a key input I/F 130 for input from a hard key or touch panel key.

The operation unit 150 has a liquid crystal display unit, a touch panel input device bonded onto the liquid crystal display unit, and a plurality of hard keys. A signal input from the touch panel or hard key is transmitted to the CPU 112 via the panel I/F 132. The liquid crystal display unit displays image data transmitted from the panel I/F 132. The liquid crystal display unit displays a function or image data in an operation of the image processing apparatus.

The real time clock module 133 updates/saves the date and time managed in the device and is backed up by the backup battery 134. The E-IDE connector (interface) 161 is used to connect an external storage device. In this embodiment, the CD-ROM drive 160 is connected via this I/F to read out a program or image data from the CD-ROM 162 that is a secondary storage device. The connectors 142 and 147 are connected to the reader unit 200 and the printer unit 300 and include asynchronous serial I/Fs (143 and 148) and video I/Fs (144 and 149), respectively.

The scanner I/F 140 is connected to the reader unit 200 via the connector 142 and to the main controller 111 via a scanner bus 141. The scanner I/F 140 also has a function of optimally binarizing an image received from the reader unit 200 in accordance with the contents of a succeeding process and a function of outputting, to the scanner bus 141, a control signal generated based on a video control signal transmitted from the reader unit 200. The bus controller 113 controls data transfer from the scanner bus 141 to the DRAM 116.

The printer I/F 145 is connected to the printer unit 300 via the connector 147 and to the main controller 111 via a printer bus 146. The printer I/F 145 has a function of smoothing image data output from the main controller 111 and outputting the image data to the printer unit 300. The printer I/F 145 also has a function of outputting, to the printer bus 146, a control signal generated based on a video control signal transmitted from the printer unit 300. The bus controller 113 controls transfer of raster image data rasterized on the DRAM 116 to the printer unit 300 so that the data is DAM-transferred to the printer unit 300 via the printer bus 146 and the video I/F 149.

Figure 4:
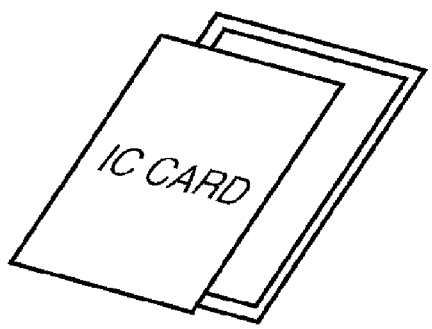
FIG. 4 is a view showing an example of a login window displayed on the operation unit of the image processing apparatus according to the embodiment.

A method of causing a user to log in to the image processing apparatus will be described next with reference to FIG. 4. FIG. 4 shows a window displayed on the operation unit 150. Immediately after power-on, the image processing apparatus displays the window to disable use of functions. When the user holds up his/her IC card over the card reader 155 in accordance with the instruction on the window, an authentication process is executed. If authentication has succeeded, the user's login to the image processing apparatus is completed. The window in FIG. 4 changes to a service setting window (FIG. 5) so that the user can use the functions. After using the functions, the user can log out of the apparatus by pressing a logout key on the operation unit 150. Alternatively, if no user operation is performed for a predetermined time, a time-out process may be executed to do logout. When logout is done, the window of the operation unit changes to the window in FIG. 4 again. In this embodiment, an IC card is used as the input means for inputting authentication information upon logging in to the image processing apparatus. However, any other input method of, for example, causing the user to input a user ID or a password directly from the operation unit 150 is also usable.

Figure 5:
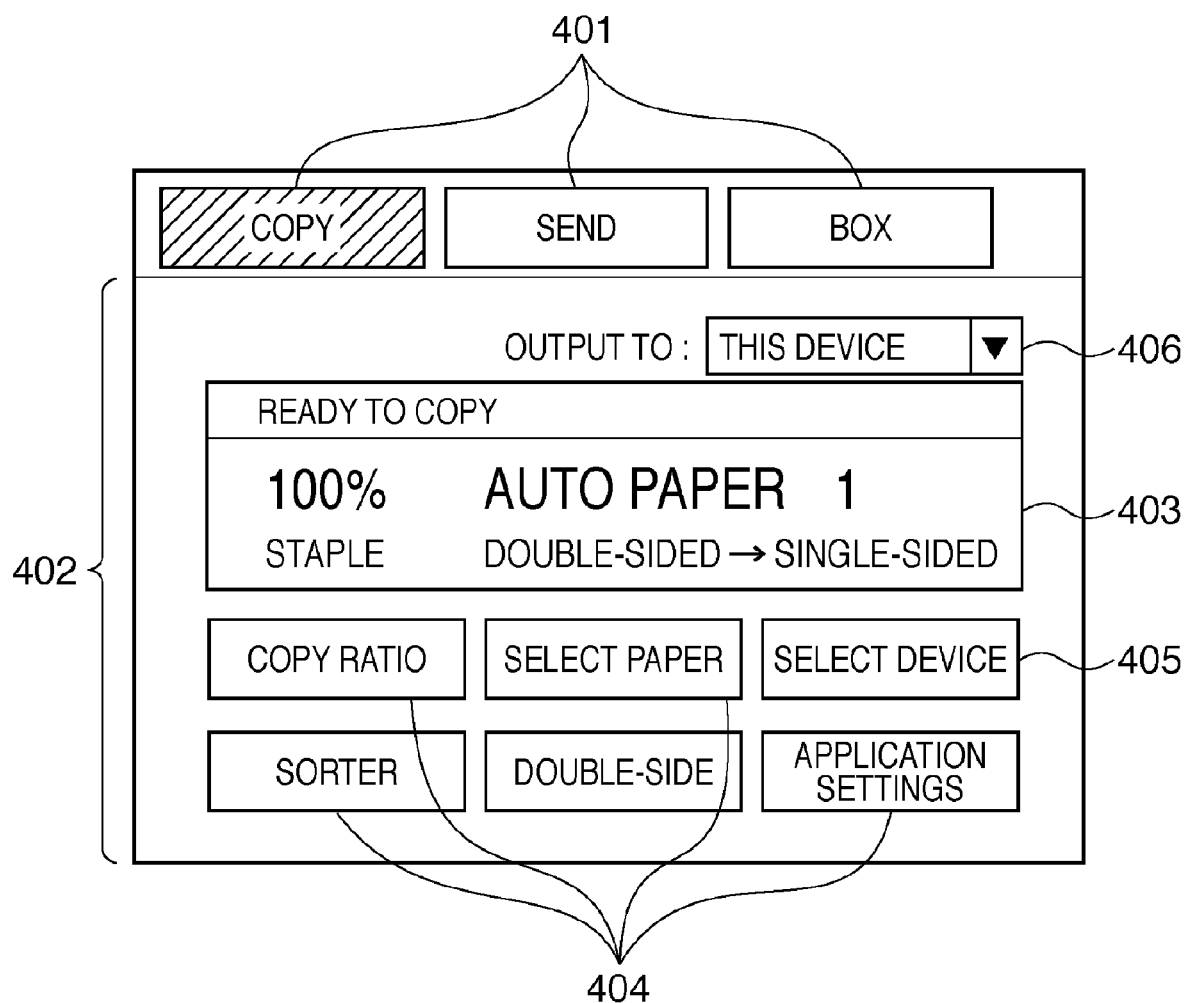
FIG. 5 is a view showing an example of a function setting window displayed on the operation unit of the image processing apparatus according to the embodiment.

A function setting window as an example of an operation window displayed on the operation unit 150 of the image processing apparatus will be described next with reference to FIG. 5. Reference numeral 401 denotes function switching tabs 401. When pressing these buttons, the contents of a window displayed in a function setting display area 402 change so that the user can switch the function to be used. In FIG. 5, an example of a setting window to use the copy function is displayed on the area 402. A set value display area 403 displays principal set contents that are currently being set. The user can display a more detailed setting window (not shown) and change various kinds of settings by pressing various setting change buttons 404. The user can display a window (FIG. 6) for selecting a remote device and select a remote device by pressing a device selection button 405. The window shown in FIG. 6 will be described later in detail. A combo-box button 406 is used to select a remote device as a setting item input target from remote devices selected in the window shown in FIG. 6. When the user presses the button, the names of image processing apparatuses selected as remote devices and "all devices" are listed. When the user selects individual remote devices, it is possible to input settings for each remote device. When the user selects "all devices", it is possible to input settings at once. The items settable by the operation unit are restricted based on the restriction of use information of the current login user. In this embodiment, after the user logs in to the local device, each remote device acquires restriction of use information for itself. It is therefore possible to set all setting items as the setting items of the remote device until the restriction of use information of the remote device is acquired. However, when the local device receives the user's restriction of use information from the remote device, the remote device function setting window is also limited to the range of the restriction of use of the user. If a use-restricted function is set for a remote device, and after that, the local device receives user's restriction of use information from the remote device, a warning window (FIG. 7) is displayed to forcibly change the set contents. If a job based on a use-restricted function is issued before user's restriction of use information is transmitted from a remote device to the local device, an execution error occurs.

Figure 6:
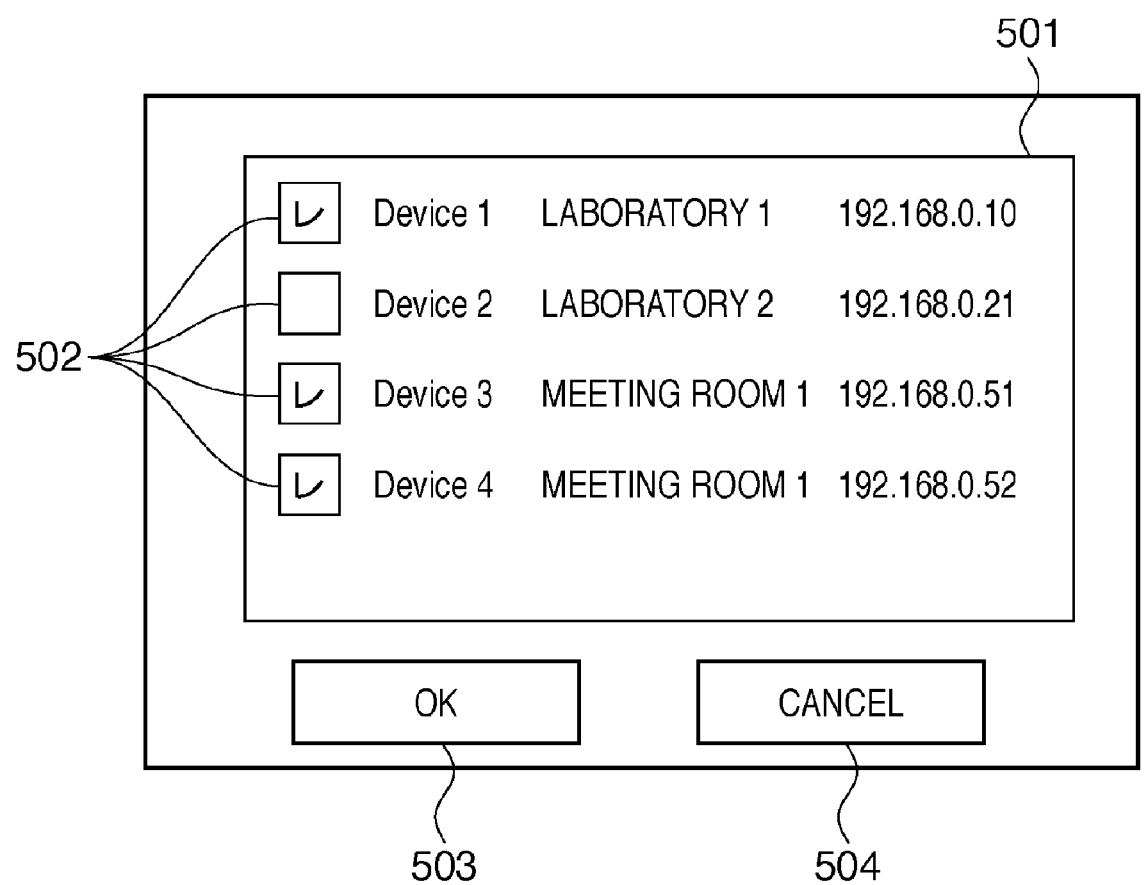
FIG. 6 is a view showing an example of an output destination setting window displayed on the operation unit of the image processing apparatus according to the embodiment.

A process of causing the user who operates the local device to select a remote device whose function is to be used will be described next with reference to FIG. 6. FIG. 6 shows a window which is displayed by pressing the device selection button 405 in the window shown in FIG. 5. A remote device list 501 shows the device names, installation places, and network addresses (e.g., IP addresses) of remote devices already registered in the local device. The remote devices displayed by the remote device list 501 are image processing apparatuses manually or automatically registered in advance in a setting window (not shown). The user selects a remote device to be used by checking a check box 502 corresponding to it. In this embodiment, a plurality of remote devices are selectable as remote devices to be used, as shown in FIG. 6. When the user checks the check boxes 502 and, in this state, presses an OK button 503, the remote devices having check marks are determined as remote devices to be used, and the window changes to that shown in FIG. 5. When the user presses a cancel button 505, the contents changed in the window are discarded, and the window returns to that shown in FIG. 5.

Figure 7:
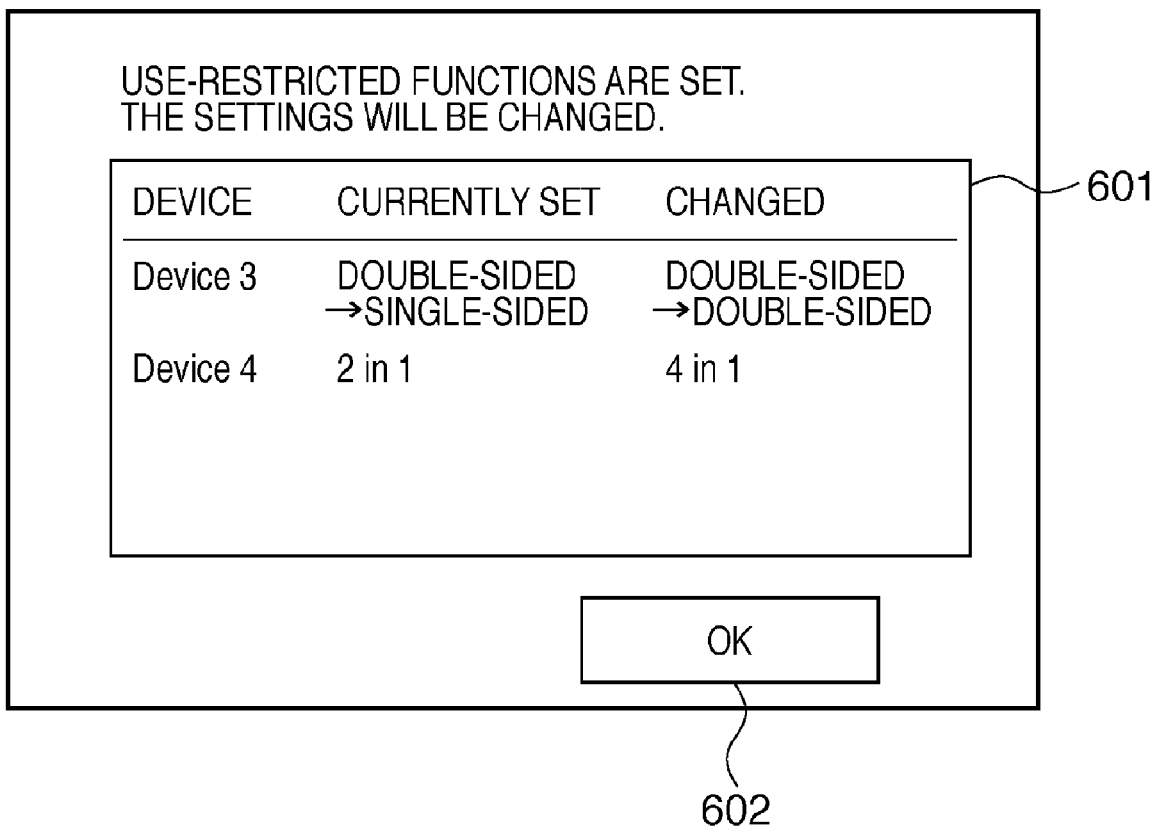
FIG. 7 is a view showing an example of a warning window displayed on the operation unit of the image processing apparatus according to the embodiment.

FIG. 7 shows an example of a warning window displayed when a use-restricted function is set for a remote device, and after that, the local device receives a user's restriction of use information from the remote device. An area 601 displays a list of current set values and set values that are changed forcibly because of a restriction of use. When the user presses an OK button 602, the settings are changed in accordance with the displayed contents, and the window returns to the function setting window in FIG. 5.

Processes executed in the local device and remote devices will be described next with reference to FIGS. 8 to 13. The flowcharts shown in FIGS. 8 to 13 are executed by the CPU 112 of each of the image processing apparatus 100 serving as the local device and the image processing apparatuses 101 to 103 serving as the remote devices in this embodiment.

Figure 8:
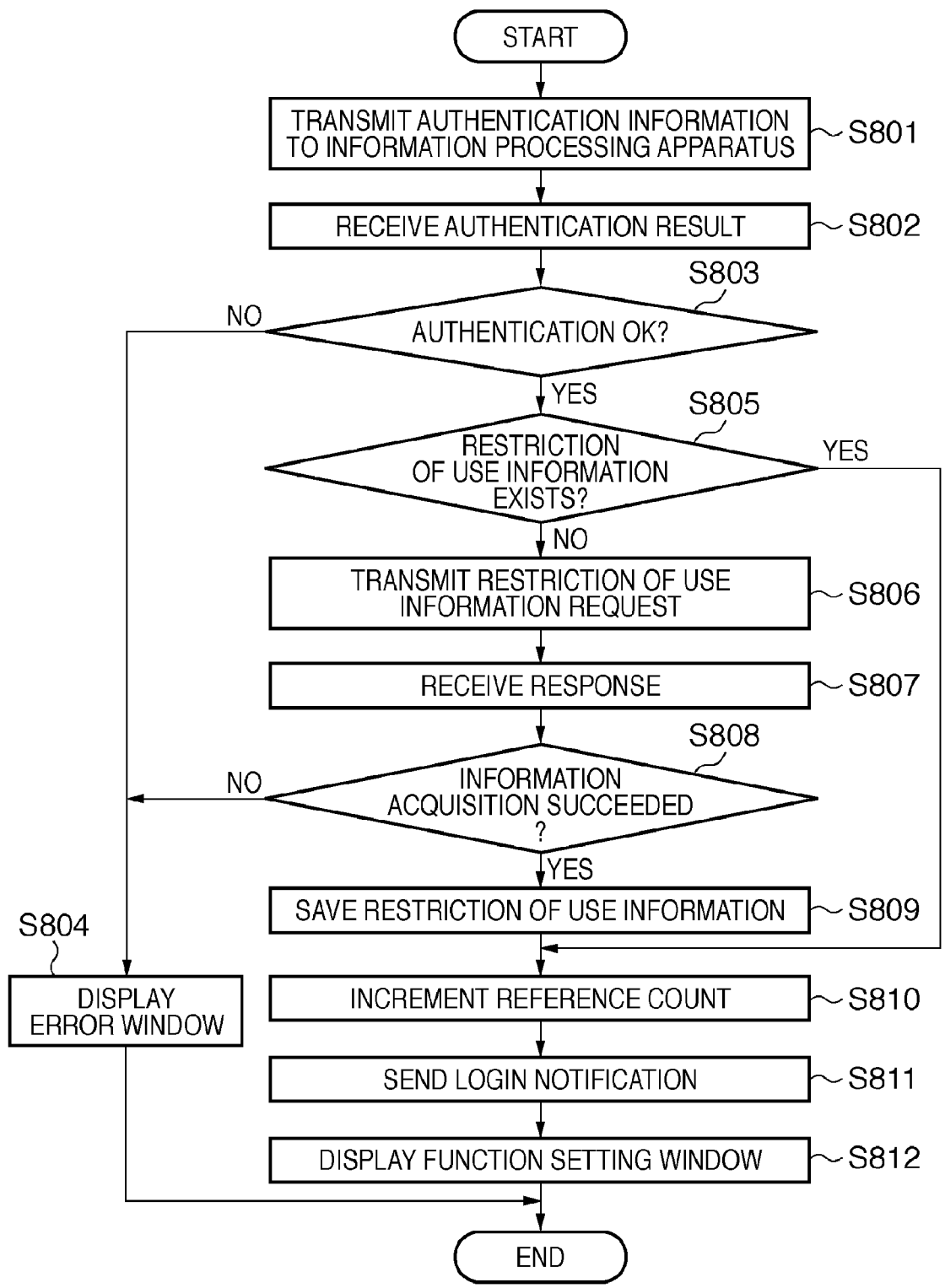
FIG. 8 is a flowchart illustrating an example of the sequence of a process of an image processing apparatus serving as a local device according to the embodiment.

FIG. 8 is a flowchart illustrating a process executed when the user puts an IC card over the card reader 155 of the image processing apparatus 100 serving as the local device according to the embodiment.

In step S801, the image processing apparatus 100 transmits authentication information acquired from the IC card to the information processing apparatus 500 via the network 400. The authentication information allows specifying a user and is, for example, a user ID. In step S802, the image processing apparatus 100 receives an authentication result transmitted from the information processing apparatus 500. The authentication process performed by the information processing apparatus 500 is a process of determining whether the user corresponding to the received user ID can use the image processing apparatus 100 serving as the local device. The information processing apparatus 500 transmits the result to the image processing apparatus 100 as the authentication result.

In step S803, the image processing apparatus 100 determines based on the authentication result received in step S802 whether the user who is going to log in to the image processing apparatus 100 can use the image processing apparatus 100. If it is determined in step S803 that the user who is going to log in cannot use the image processing apparatus 100, the process advances to step S804. If it is determined that the user can use the image processing apparatus 100, the process advances to step S805.

In step S804, the image processing apparatus 100 displays an error window on the operation unit 150 and finishes the process. On the other hand, in step S805, the image processing apparatus 100 determines whether it holds the restriction of use information about the user specified by the authentication information acquired from the IC card in step S801. Restriction of use information indicates, of the plurality of functions of the image processing apparatus, a function usable (or a function unusable) by the user. If it is determined that the image processing apparatus holds the restriction of use information, the process advances to step S810. Otherwise, the process advances to step S806.

In step S806, the image processing apparatus 100 requests the information processing apparatus 500 to transmit the restriction of use information, for the image processing apparatus 100, of the user corresponding to the authentication information acquired in step S801. In step S807, the image processing apparatus 100 receives the restriction of use information about the user for the image processing apparatus 100 from the information processing apparatus 500 as a response to the request transmitted in step S806. In step S808, the image processing apparatus 100 determines whether the reception of restriction of use information has succeeded. If the reception has failed, the image processing apparatus 100 displays the error window and finishes the process in step S804. On the other hand, if the reception has succeeded, the process advances to step S809. In step S809, the image processing apparatus 100 saves the received restriction of use information in the memory.

In step S810, the image processing apparatus 100 increments the value of a variable representing the reference count of the restriction of use information saved in step S809 by one. Each of the image processing apparatuses 100 to 103 of this embodiment manages, on a memory, a variable representing the reference count of restriction of use information received from the information processing apparatus 500. The variable value is decremented by one when the user has logged out of the image processing apparatus, as will be described in the subsequent flowcharts. If the variable value is 0, the saved restriction of use information is deleted. If the variable value is not 0 (i.e., 1 or more), the restriction of use information is kept saved in the memory such as the ROM 114. With this control, if the same user logs in to a plurality of local devices and logs out of one of them, restriction of use information held in the remaining local devices or remote devices is not deleted.

In step S811, the image processing apparatus 100 notifies the remote devices connected to the network 400 that the user has logged in to the image processing apparatus 100. More specifically, the image processing apparatus 100 transmits the authentication information acquired in step S801. In this embodiment, the image processing apparatus 100 transmits the authentication information to the image processing apparatuses 101 to 103. The transmission in step S811 may be done by broadcasting the authentication information to all remote devices connected to the network 400. Alternatively, remote devices registered in the image processing apparatus 100 are referred to in the memory so that the authentication information is transmitted to, of the image processing apparatuses connected to the network 400, only those registered in the image processing apparatus 100 as remote devices.

In step S812, the image processing apparatus 100 completes the user's login process to the image processing apparatus 100 and displays the function setting window shown in FIG. 5 on the operation unit 150. Consequently, the user can give the instruction for execution of a process using the image processing apparatus 100 by operating the function setting window. Based on of the received restriction of use information, the function setting window displayed at this time inhibits the user from setting an unusable function. For example, if the user cannot use a color print function, display of the button to give the instruction for color printing is turned off or grayed out.

The local device of this embodiment makes itself usable when authentication for only the local device is ended without waiting for the user authentication results for the remote devices. That is, the local device is made usable without waiting for restriction of use information transmitted from each remote device as the authentication result based on the authentication information transmitted in step S811. This shortens the wait time in user login to the local device and improves the operability.

Figure 9:
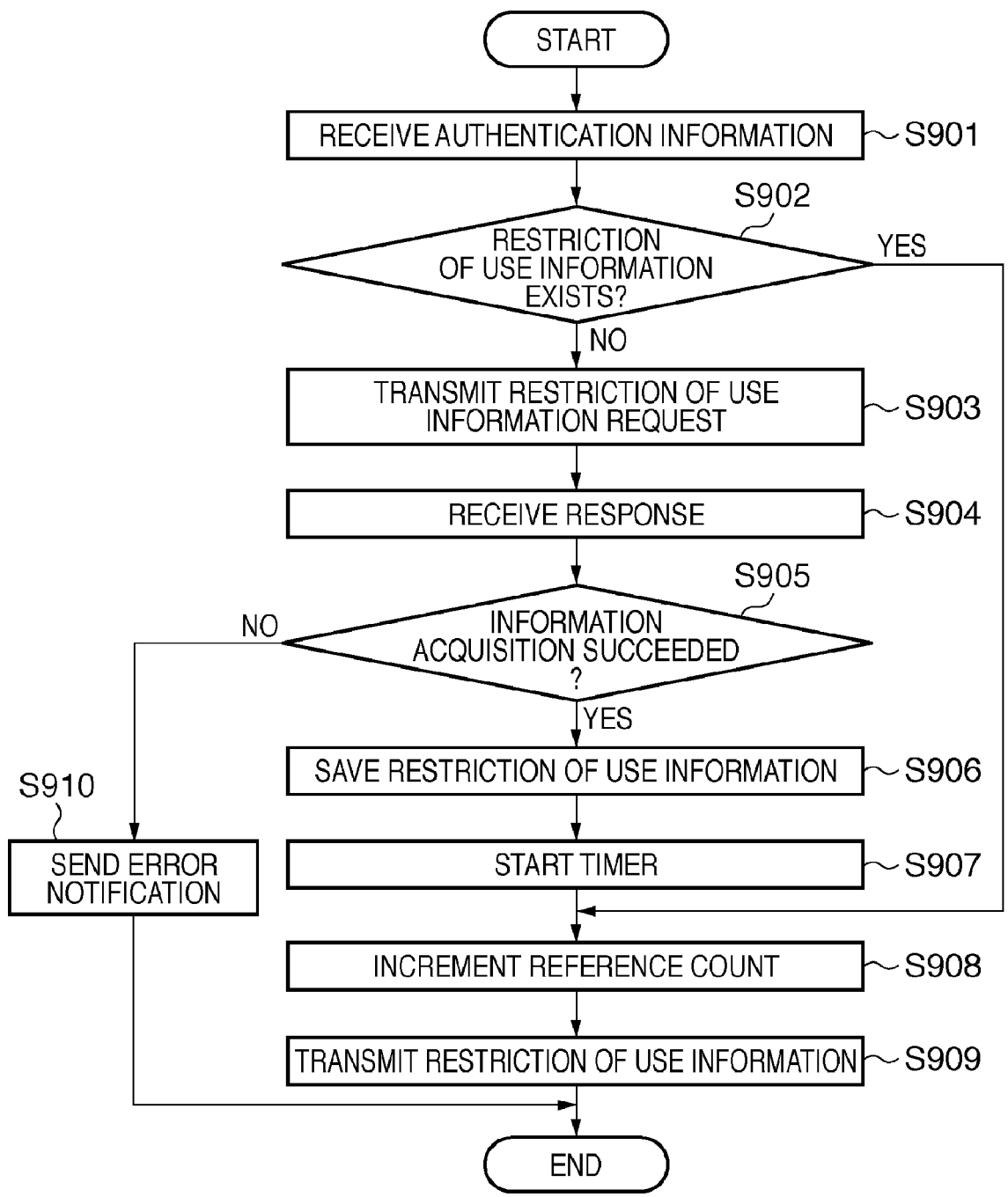
FIG. 9 is a flowchart illustrating an example of the sequence of a process of an image processing apparatus serving as a remote device according to the embodiment.

FIG. 9 is a flowchart illustrating a process of the image processing apparatuses 101 to 103 each serving as a remote device according to the embodiment. The operation of the image processing apparatus 101 as an example of the remote device will be explained below. The image processing apparatuses 102 and 103 as the remaining remote devices also execute the same operation. The flowchart in FIG. 9 illustrates a process executed when the image processing apparatus 101 receives authentication information (step S811 in FIG. 8) transmitted from the image processing apparatus 100 serving as the local device.

In step S901, the image processing apparatus 101 receives authentication information transmitted from the image processing apparatus 100 serving as the local device. In step S902, the image processing apparatus 101 determines whether it holds the restriction of use information about the user specified by the authentication information received in step S901. If it is determined that the image processing apparatus holds the restriction of use information, the process advances to step S908. Otherwise, the process advances to step S903.

In step S903, the image processing apparatus 101 requests the information processing apparatus 500 to transmit the restriction of use information, for the image processing apparatus 101, of the user corresponding to the authentication information acquired in step S901. In step S904, the image processing apparatus 101 receives the restriction of use information about the user for the image processing apparatus 101 from the information processing apparatus 500 as a response to the request transmitted in step S903. In step S905, the image processing apparatus 101 determines whether the reception of restriction of use information has succeeded. If the reception has failed, the image processing apparatus 101 displays the error window and finishes the process in step S910. On the other hand, if the reception has succeeded, the process advances to step S906. In step S906, the image processing apparatus 101 saves the received restriction of use information in the memory.

In step S907, the image processing apparatus 101 creates and starts a timer corresponding to the user specified by the authentication information received in step S901. The timer prevents the image processing apparatus 101 from waiting for any excess information if communication with the image processing apparatus 100 serving as the local device is disabled by some reason.

In step S908, the image processing apparatus 101 increments the value of a variable representing the reference count of the restriction of use information saved in step S906 by one.

In step S909, the image processing apparatus 101 transmits the restriction of use information saved in step S906 to the image processing apparatus 100 that is the transmission source of the restriction of use information received in step S901 and finishes the process.

Figure 10:
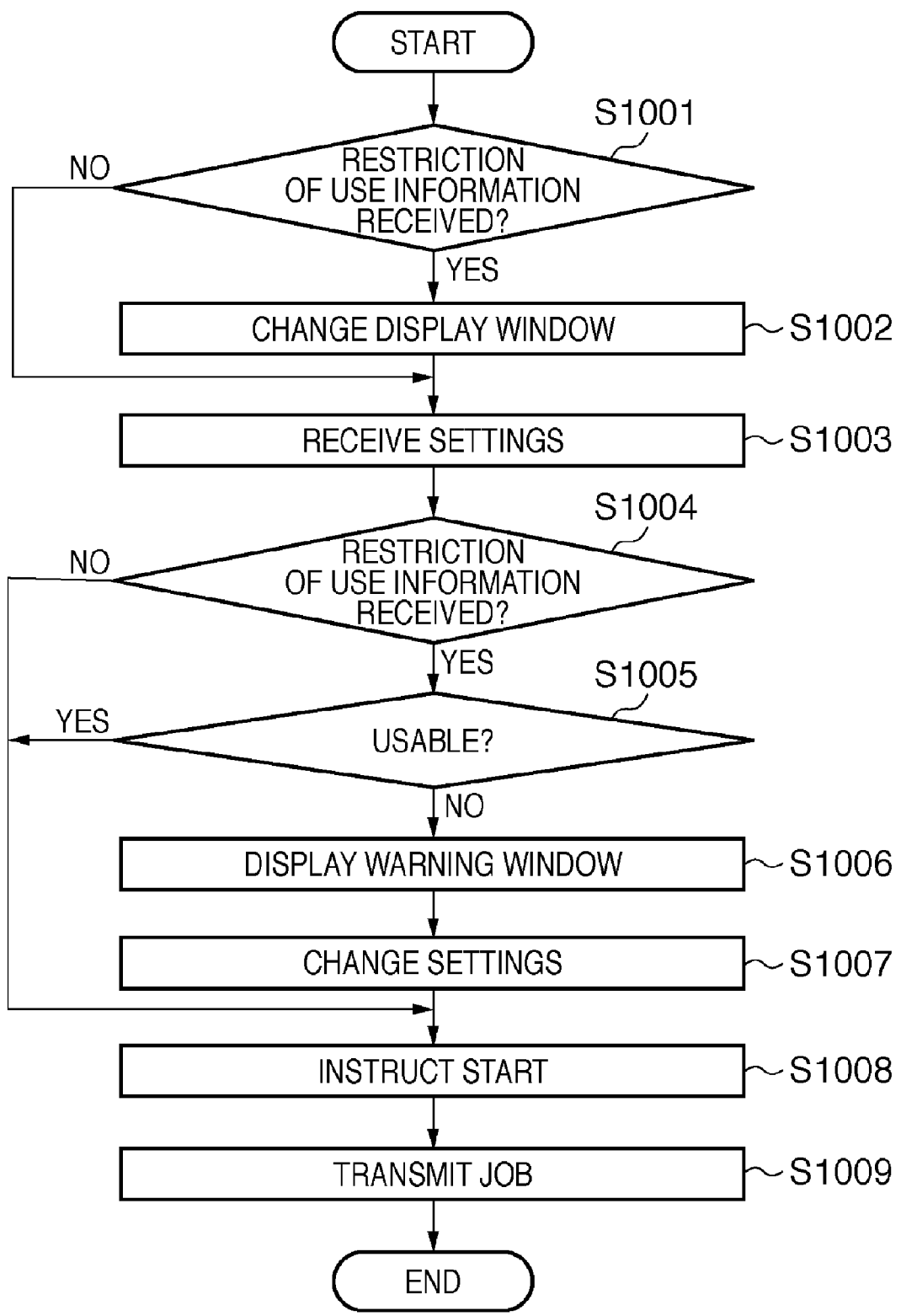
FIG. 10 is a flowchart illustrating an example of the sequence of a process of the image processing apparatus serving as the local device according to the embodiment.

FIG. 10 is a flowchart illustrating a process executed by the image processing apparatus 100 serving as the local device according to the embodiment. The flowchart in FIG. 10 is executed after the flowchart in FIG. 8 is processed, and the user has logged in to the image processing apparatus 100.

In step S1001, the image processing apparatus 100 determines whether restriction of use information is received from one of the image processing apparatuses 101 to 103 serving as the remote devices. The received restriction of use information contains information representing, of a plurality of functions of the image processing apparatus of the transmission source, a function usable (or unusable) by the user who has logged in to the local device. For example, restriction of use information transmitted from the image processing apparatus 101 contains information representing that the user is inhibited from using the color print function and stapling function of the image processing apparatus 101. Restriction of use information transmitted from the image processing apparatus 102 contains information representing that the user is inhibited from using the FAX function of the image processing apparatus 102. If the restriction of use information is received, the process advances to step S1002.

In step S1002, the image processing apparatus 100 changes the function setting window displayed on the operation unit 150 based on the restriction of use information received in step S1001. For example, assume that restriction of use information representing that color printing is impossible is received from the image processing apparatus 101 in step S1001. In this case, when the user selects the image processing apparatus 101 by the combo-box button 406, a window which disables a color printing instruction is displayed.

In step S1003, the image processing apparatus 100 receives settings input by the user via the function setting window shown in FIG. 5. In step S1004, the image processing apparatus 100 determines again whether restriction of use information is received from the image processing apparatuses 101 to 103 as the remote devices. When no restriction of use information has been received in step S1001, the image processing apparatus 100 may receive restriction of use information during the time when the user is setting the function to be used. Alternatively, even when restriction of use information is received from one of the remote devices in step S1001, another remote device may have transmitted restriction of use information after that. If it is determined that no restriction of use information is received, the process advances to step S1008. Otherwise, the process advances to step S1005.

In step S1005, the image processing apparatus 100 compares the function already set by the user using the operation unit 150 of the image processing apparatus 100 with the restriction of use information received in step S1004. The image processing apparatus 100 thus determines whether the function already set in the image processing apparatus 100 is a function unusable by the user. If it is determined in step S1005 that an unusable function is set, the process advances to step S1006. Otherwise, the process advances to step S1008.

In step S1006, the image processing apparatus 100 displays the warning window shown in FIG. 7 on the operation unit 150. More specifically, a window is displayed to prompt the user to change the setting within the usable range concerning the already set unusable function. In step S1007, the image processing apparatus 100 changes the setting of the function unusable by the user to the usable function based on the received restriction of use information.

In step S1008, the image processing apparatus 100 receives a job start instruction input by the user via the operation unit 150. In step S1009, the image processing apparatus 100 transmits a job to be executed to the designated remote device based on the settings received in step S1003 or settings changed in step S1007. The process in step S1009 is an example of a process of causing the image processing apparatus 100 to process a job in cooperation with any one of the remote devices. If the image processing apparatus 100 should execute a job alone without using a remote device, the process sin step S1009 is not executed. Instead, the image processing apparatus 100 simply executes a designated job.

In the example shown in FIG. 10, if no restriction of use information is received in step S1004, the process can advance to step S1008 to give the instruction to start a job. More specifically, before reception of restriction of use information, it is possible to transmit, to the remote device, a job in which a function unusable by the user is set. Upon receiving the job, the remote device compares the function designated in the received job with the restriction of use information acquired from the information processing apparatus 500 and determines whether the job is executable. Upon determining that a function unusable by the user is set, and the job is not executable, the remote device returns a job execution error to the image processing apparatus 100.

In the example shown in FIG. 10, if no restriction of use information is received in step S1004, the process can advance to step S1008 to give the instruction to start a job. However, if the image processing apparatus 100 has received settings to use a remote device in step S1003, control may be done to inhibit the job start instruction unless restriction of use information is received from the remote device in step S1004. More specifically, the determination in step S1004 may be repeated without advancing the process to step S1008 until restriction of use information is received in step S1004.

Figure 11:
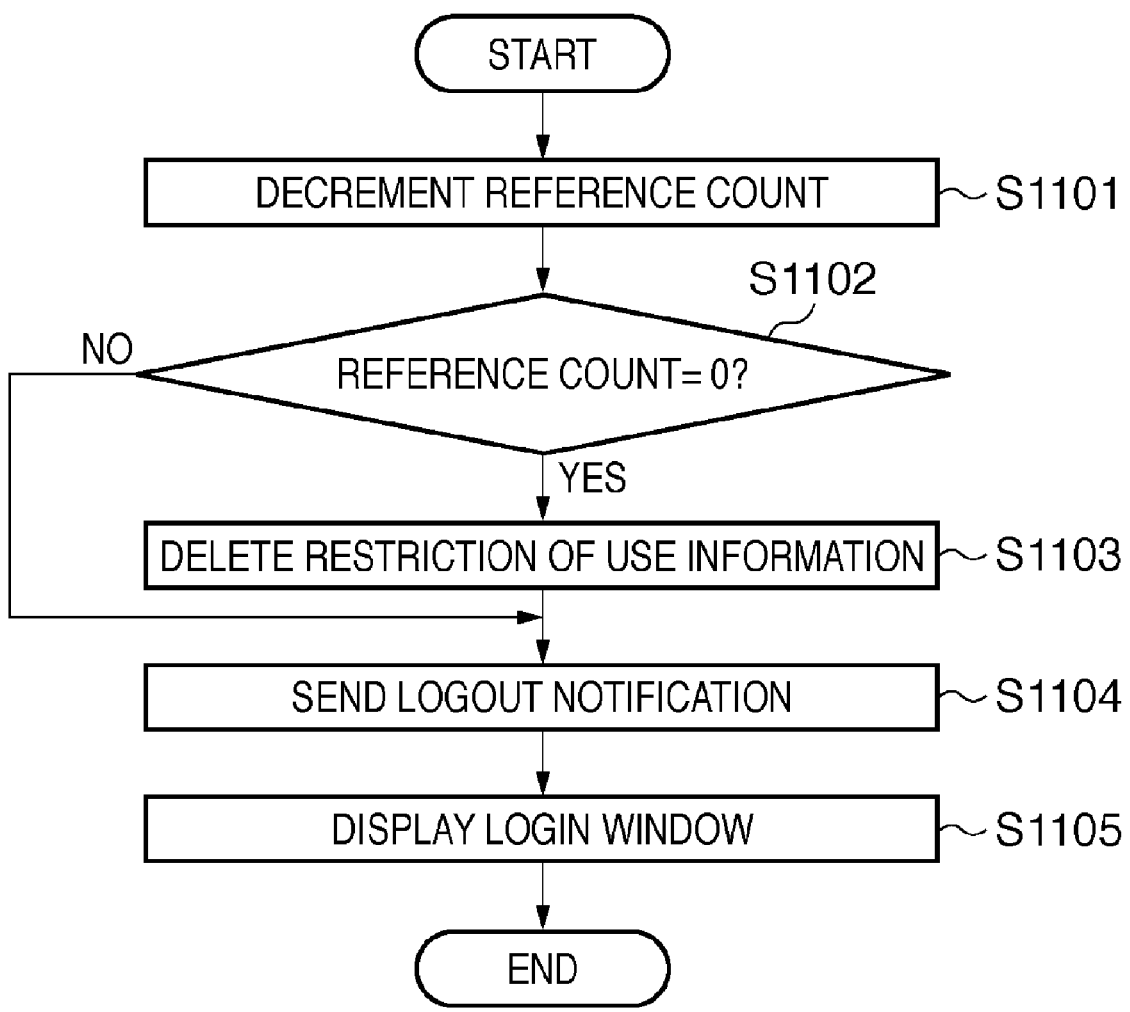
FIG. 11 is a flowchart illustrating an example of the sequence of a process of the image processing apparatus serving as the local device according to the embodiment.

FIG. 11 is a flowchart illustrating a process executed by the image processing apparatus 100 serving as the local device according to the embodiment. The flowchart in FIG. 11 is executed when the user who has logged in to the image processing apparatus 100 in the process shown in FIG. 8 logs out.

In step S1101, the image processing apparatus 100 detects a logout instruction from the user and decrements the variable value representing the reference count of the restriction of use information about the user by one. That is, the variable value incremented by one in step S810 in FIG. 8 is decremented by one.

In step S1102, the image processing apparatus 100 determines whether the reference count of the restriction of use information about the user is 0. If it is determined that the reference count is 0, the process advances to step S1103. Otherwise, the process advances to step S1104.

In step S1103, the image processing apparatus 100 deletes, from its own memory, the restriction of use information which is saved in the memory in step S809 in FIG. 8. Then, in step S1104, the image processing apparatus 100 transmits a logout notification to the remote devices connected to the network 400. The logout notification includes information representing the user who is going to log out. The logout notification may be broadcast to all remote devices connected to the network 400 or transmitted to only remote devices registered in the image processing apparatus 100. However, the logout notification is sent to at least the remote device which has received the login notification in step S811 in FIG. 8.

In step S1105, the image processing apparatus 100 displays the login window shown in FIG. 4 on the operation unit 150 and finishes the process.

Figure 12:
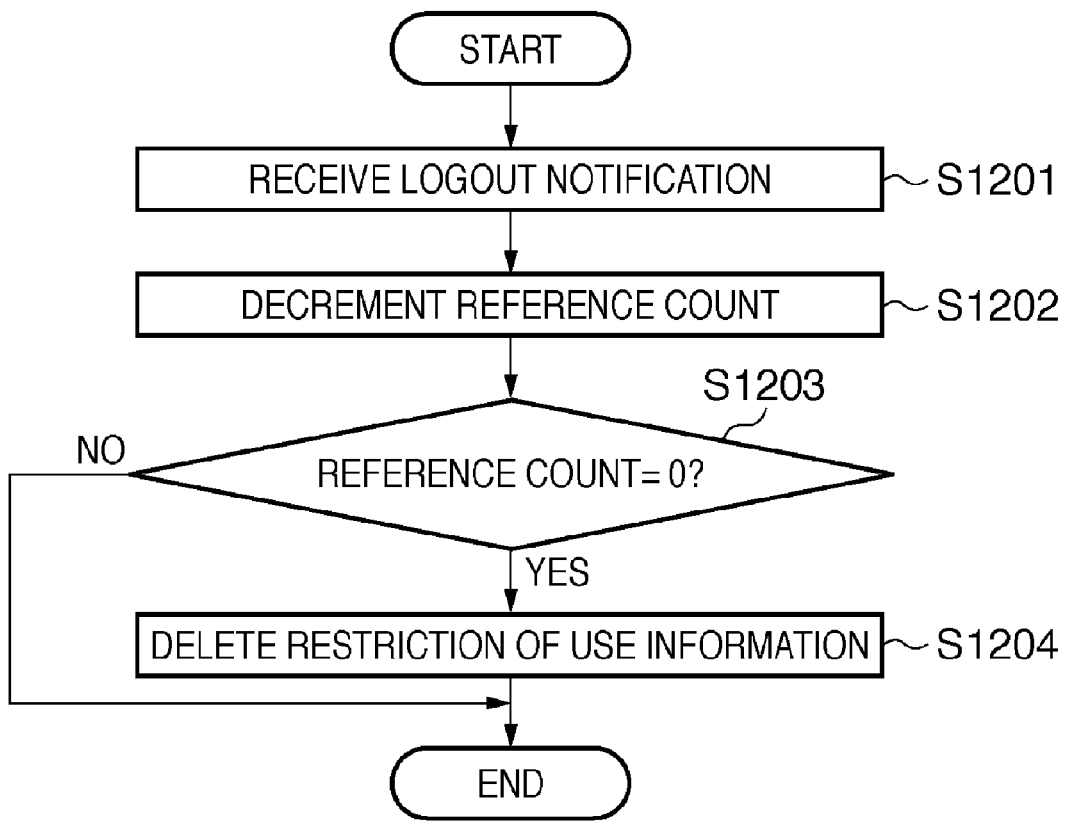
FIG. 12 is a flowchart illustrating an example of the sequence of a process of the image processing apparatus serving as the remote device according to the embodiment.
Figure 13:
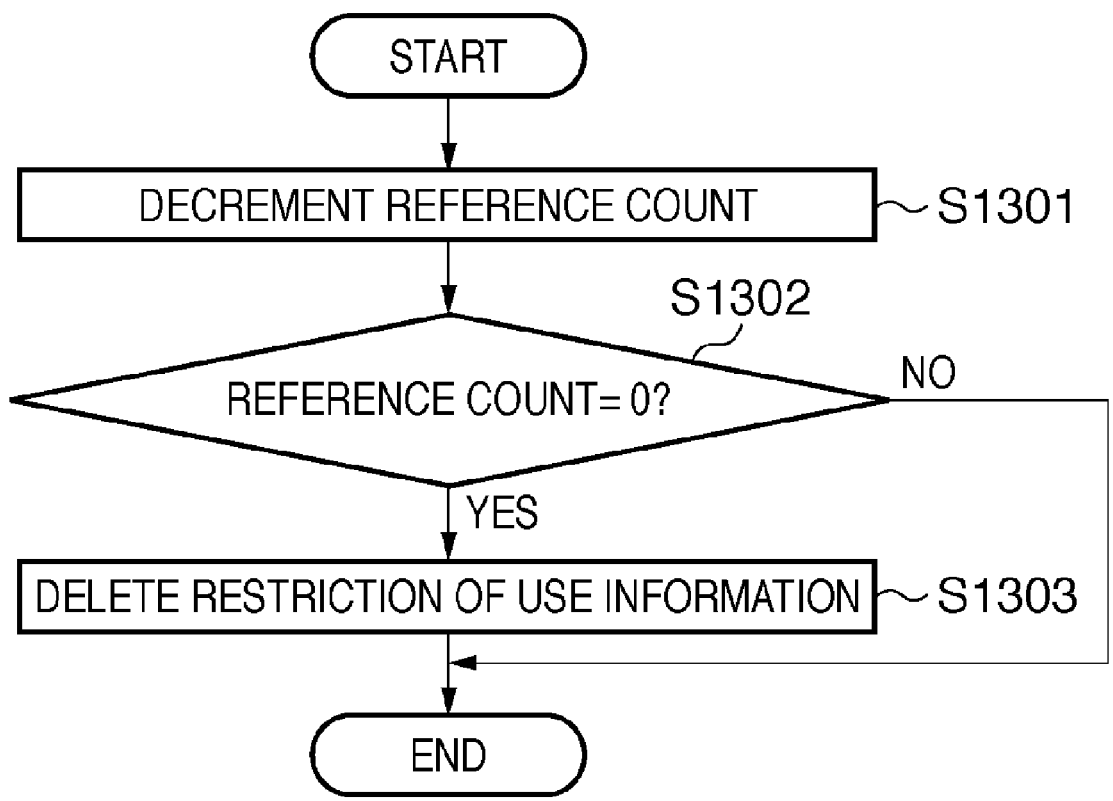
FIG. 13 is a flowchart illustrating an example of the sequence of a process of the image processing apparatus serving as the remote device according to the embodiment.

FIGS. 12 and 13 are flowcharts illustrating a process of the image processing apparatuses 101 to 103 each serving as a remote device according to the embodiment. The operation of the image processing apparatus 101 as an example of the remote device will be explained below. The image processing apparatuses 102 and 103 as the remaining remote devices also execute the same operation.

FIG. 12 illustrates a process executed when the image processing apparatus 101 has received the logout notification (step S1104 in FIG. 11) transmitted from the image processing apparatus 100 serving as the local device.

In step S1201, the image processing apparatus 101 receives the logout notification transmitted from the image processing apparatus 100. In step S1202, the image processing apparatus 101 decrements by one the variable value contained in the logout notification and representing the reference count of the restriction of use information about the user. That is, the variable value incremented by one in step S908 in FIG. 9 is decremented by one.

In step S1203, the image processing apparatus 101 determines whether the reference count of the restriction of use information about the user is 0. If it is determined that the reference count is 0, the process advances to step S1204. Otherwise, the process is ended. In step S1204, image processing apparatus 101 deletes, from its own memory, the restriction of use information which is saved in the memory in step S906 in FIG. 9 and finishes the process.

FIG. 13 is a flowchart illustrating a process executed when the timer set in step S907 in FIG. 9 has timed out.

In step S1301, the image processing apparatus 101 decrements by one the variable value representing the reference count of the restriction of use information about the user corresponding to the timer. In step S1302, the image processing apparatus 101 determines whether the reference count of the restriction of use information about the user is 0. If it is determined that the reference count is 0, the process advances to step S1303. Otherwise, the process is ended. In step S1303, image processing apparatus 101 deletes, from its own memory, the restriction of use information which is saved in the memory in step S906 in FIG. 9 and finishes the process.

Figure 14:
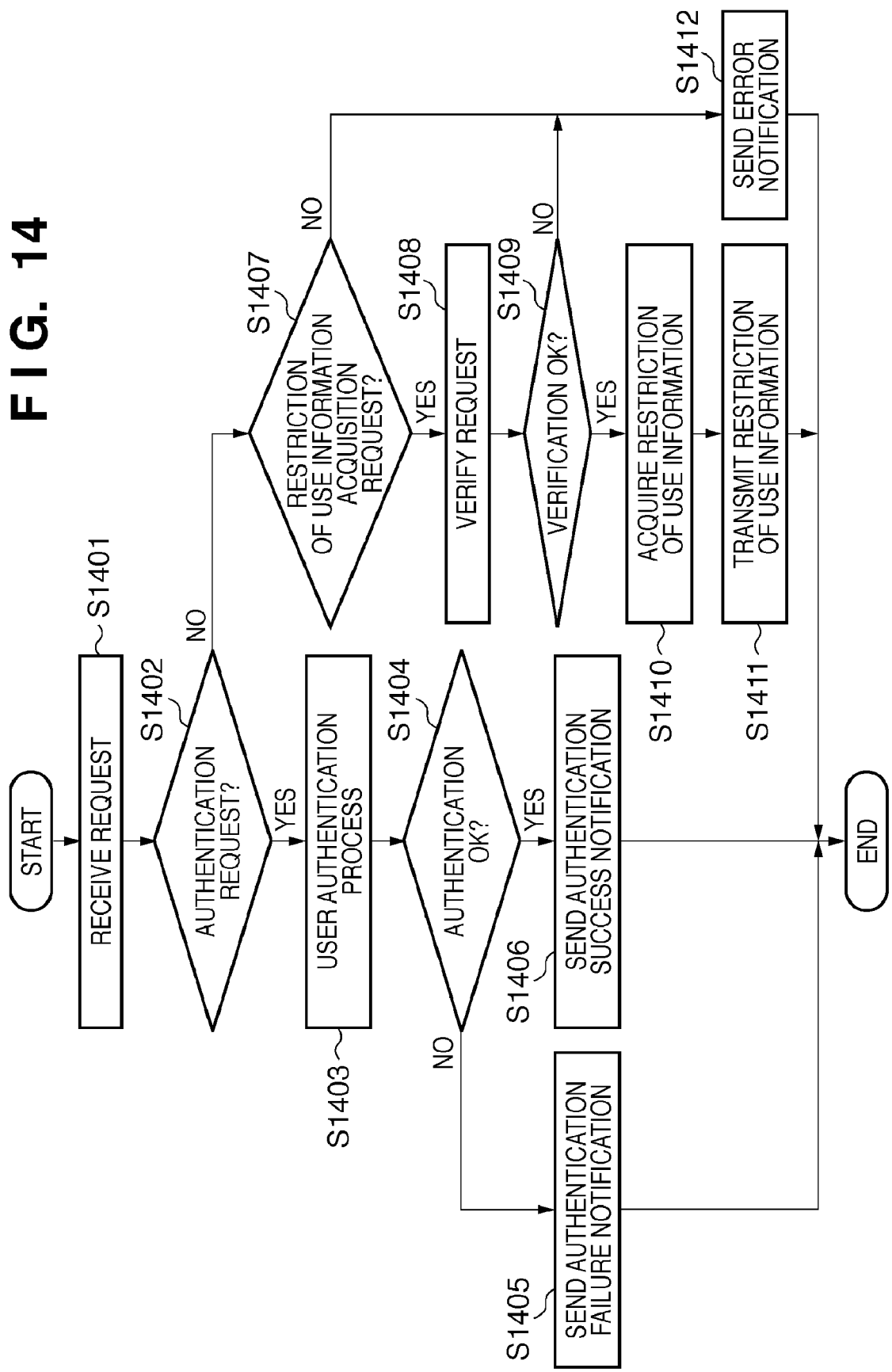
FIG. 14 is a flowchart illustrating an example of the sequence of a process of an information processing apparatus according to the embodiment.
Figure 15:
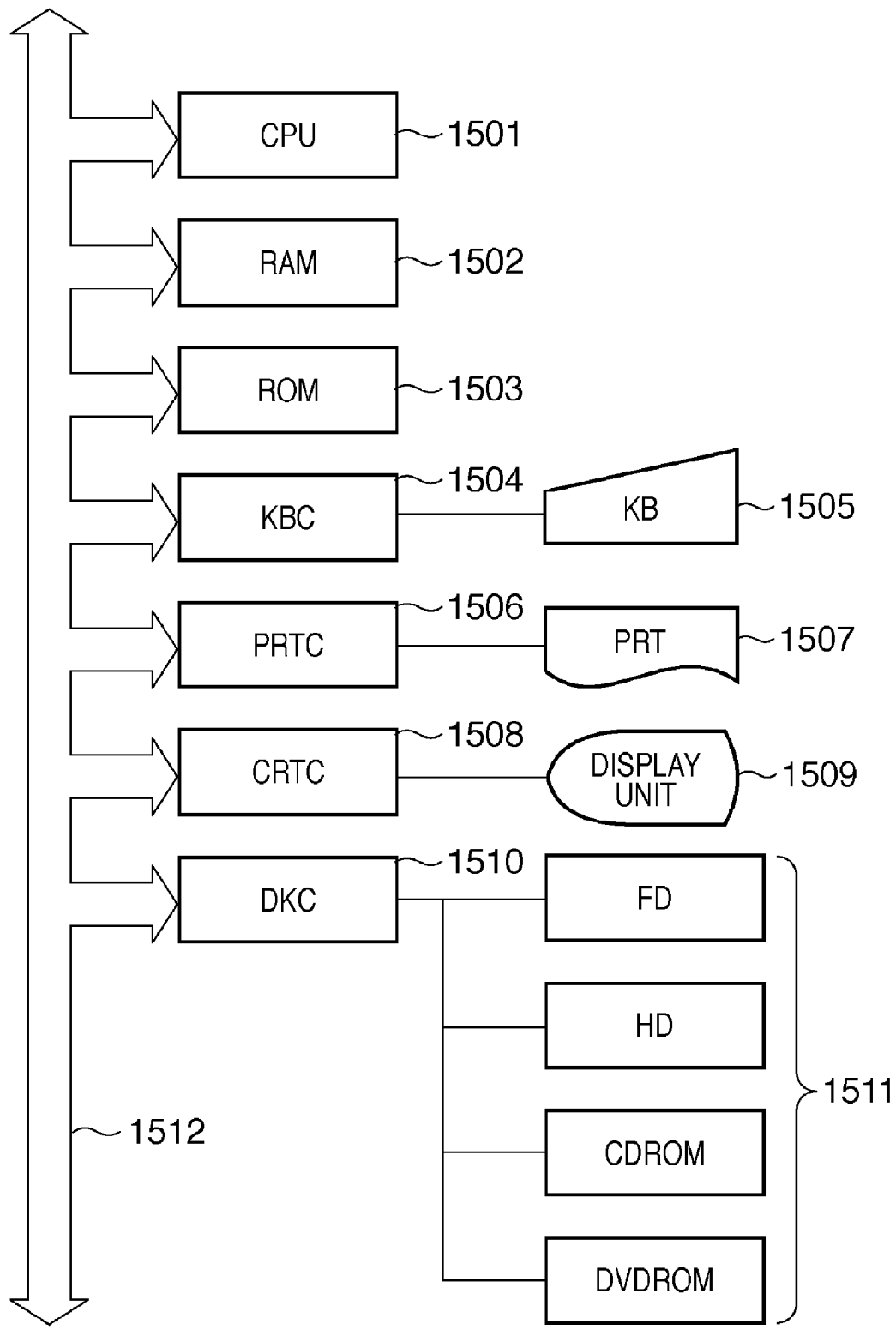
FIG. 15 is a block diagram showing the hardware configuration of the information processing apparatus according to the embodiment.

FIG. 14 is a flowchart illustrating a process executed by the information processing apparatus 500 serving as an authentication server according to the embodiment. FIG. 15 is a block diagram showing the configuration of the hardware module of the information processing apparatus 500 according to the embodiment. The flowchart shown in FIG. 14 is executed when a CPU 1501 of the information processing apparatus 500 processes a program stored in a ROM 1503.

In step S1401, the information processing apparatus 500 receives a request transmitted from an information processing apparatus serving as a local device or a remote device.

In step S1402, the information processing apparatus 500 determines whether the request received in step S1401 is authentication information. If authentication information is received, the process advances to step S1403. Otherwise, the process advances to step S1407.

In step S1403, the information processing apparatus 500 executes an authentication process based on the received authentication information. More specifically, the information processing apparatus 500 specifies the user by analyzing the received authentication information and refers to the database held within itself. The database describes usable image processing apparatuses for each user, and his/her restriction of use information for each of the usable image processing apparatuses. FIG. 16 shows an example of the database stored in an external storage device such as a ROM or HD of the information processing apparatus 500. In the example in FIG. 16, functions usable by each of users A and B are shown for each of image processing apparatuses A and B. In the example in FIG. 16, a column 1601 indicates restriction of use information about the user A. The user A can use the copy function and transmitting function of the image processing apparatus A. As the copy function, color copy and double-sided copy are possible. As the transmitting function, FAX transmission is possible. A column 1602 indicates restriction of use information about the user B. The user B can use the copy function and transmitting function of the image processing apparatus A. As the transmitting function, the user B can use FAX transmission. The user B cannot use the image processing apparatus B. In step S1404, the information processing apparatus 500 determines whether the user specified by the received authentication information can use the image processing apparatus of the authentication information transmission source. If it is determined that the user can use the image processing apparatus, the process advances to step S1406. Otherwise, the process advances to step S1405.

In step S1405, the information processing apparatus 500 transmits, to the image processing apparatus of the authentication information transmission source, a response representing that the image processing apparatus is unusable. In step S1406, the information processing apparatus 500 transmits, to the image processing apparatus of the authentication information transmission source, a response representing that the image processing apparatus is usable.

In step S1407, the information processing apparatus 500 determines whether the request received from the image processing apparatus is a restriction of use information acquisition request. If it is a restriction of use information acquisition request, the process advances to step S1408 to verify the request. If it is determined in step S1409 as a result of verification that the request is authentic, the process advances to step S1410. If it is determined in step S1407 that the received request is not a restriction of use information acquisition request, or if it is determined in step S1409 that the request is not authentic, the process advances to step S1412 to transmit an error notification to the image processing apparatus of the request transmission source.

In step S1410, the information processing apparatus 500 acquires, from the database, restriction of use information about the user, who is specified by the authentication information, for the image processing apparatus of the request transmission source. Assume that the specified user is the user A, and the image processing apparatus of the request transmission source is the image processing apparatus A. In this case, the information processing apparatus 500 acquires information of a portion 1603 about the user A from the database shown in FIG. 16. Assume that the specified user is the user A, and the image processing apparatus of the request transmission source is the image processing apparatus B. In this case, the information processing apparatus 500 acquires information of a portion 1604 about the user A from the database shown in FIG. 16. In step S1411, the information processing apparatus 500 transmits the restriction of use information acquired in step S1410 to the image processing apparatus of the request transmission source.

The above-described arrangement prevents the user from waiting for an unnecessarily long time until login using the local device even when the number of remote devices increases. It is therefore possible to implement function restriction of use for each image processing apparatus without degrading the usability for the user.

Other Embodiments

In the first embodiment, the user can make all settings in the local device until the restriction of use information about the user is received from a remote device. However, the user may be inhibited from making all settings.

In the first embodiment, a remote device notifies the local device of the restriction of use information about the user. However, after login, the local device may send an inquiry to the remote device in parallel to the function setting process of the operation unit.

In the first embodiment, when the local device or remote device holds restriction of use information, that information is directly used. However, the device may inquire of the information processing apparatus about whether the restriction of use information has been updated. If the restriction of use information has been updated, the device may acquire the restriction of use information again from the server and update it.

In the first embodiment, each remote device acquires restriction of use information about itself from the information processing apparatus. However, the local device may acquire restriction of use information about each remote device. In this case, the local device does not transmit the login notification to the remote devices in step S811 in FIG. 8. Upon receiving restriction of use information about the local device from the information processing apparatus, login is completed. After completing login, the local device may acquire restriction of use information about each remote device from the information processing apparatus. This enables to achieve the object of the present invention without applying, to each remote device, a load of restriction of use information acquisition from the information processing apparatus.

The present invention can also be achieved by supplying a storage medium which records the computer program codes of software for implementing the flowcharts of the above-described embodiment to a system or apparatus, and causing the computer (CPU or MPU) of the system or apparatus to read out and execute the program codes stored in the storage medium.

In this case, the program codes themselves read out from the storage medium implement the functions of the above-described embodiment. The storage medium that stores the program codes constitutes the present invention.

Examples of the storage medium for supplying the program codes are a floppy disk, hard disk, optical disk, magnetooptical disk, CD-ROM, CD-R, DVD-ROM, magnetic tape, nonvolatile memory card, and ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-160217 filed on Jun. 18, 2007, which is hereby incorporated by reference herein in its entirety.

The invention claimed is:

1. An image processing apparatus for transmitting input image data to another image processing apparatus and causing said other image processing apparatus to process the image data, the image processing apparatus being connected to an information processing apparatus for managing restriction information for each user, comprising:

an input unit configured to input authentication information to specify a user;

a first transmission unit configured to transmit a request to acquire first restriction information about the user in using the image processing apparatus in accordance with input by said input unit, wherein the first transmission unit transmits the request to acquire the first restriction information to the information processing apparatus;

a second transmission unit configured to transmit a request to acquire second restriction information about the user in using said other image processing apparatus in accordance with input by said input unit, wherein the second transmission unit transmits the request to acquire the second restriction information to the other image processing apparatus;

a control unit configured to complete login of the user to the image processing apparatus in accordance with acquisition of the first restriction information regardless of acquisition of the second restriction information;

a first reception unit configured to receive the first restriction information from the information processing apparatus;

a second reception unit configured to receive the second restriction information from the other image processing apparatus;

a determination unit configured to determine whether the image processing apparatus holds the first restriction information;

a unit configured to increment a value representing a reference count of the first restriction information by one when said determination unit determines that the image processing apparatus holds the first restriction information, or when the first reception unit receives the first restriction information;

a unit configured to decrement the value representing the reference count by one when a logout instruction is received from the user;

a second determination unit configured to determine, upon receiving the logout instruction from the user, whether the value representing the reference count is 0; and a deletion unit configured to delete the held first restriction information or the first restriction information received by the first reception unit when the second determination unit determines that the value representing the reference count is 0.

2. The apparatus according to claim 1, characterized in that said second transmission unit transmits the request to acquire the second restriction information before said control unit completes login of the user.

3. The apparatus according to claim 1, characterized in that said control unit does not complete login of the user to the image processing apparatus until the first restriction information is acquired.

4. The apparatus according to claim 1, characterized by further comprising a display unit configured to display, based on the acquired first restriction information, an operation window which inhibits designation of, of functions of the image processing apparatus, a function unusable by the user.

5. The apparatus according to claim 4, characterized in that when said other image processing apparatus is selected on the operation window, said display unit displays, based on the acquired second restriction information, an operation window which inhibits designation of, of functions of said other image processing apparatus, a function unusable by the user.

6. The apparatus according to claim 4, characterized in that if of functions of said other image processing apparatus, a function unusable by the user is already designated when acquiring the second restriction information, said display unit displays a window representing that the already designated function is unusable.

7. The apparatus according to claim 1, characterized by further comprising a third transmission unit configured to, upon receiving a logout instruction from the user, transmit a notification representing that the user is going to log out of the image processing apparatus to said other image processing apparatus.

8. A method of controlling an image processing apparatus for transmitting input image data to another image processing apparatus and causing said other image processing apparatus to process the image data, the image processing apparatus being connected to an information processing apparatus for managing restriction information for each user, comprising:

an input step of inputting authentication information to specify a user;

a first transmission step of transmitting a request to acquire first restriction information about the user in using the image processing apparatus in accordance with input in the input step, wherein the first transmission step transmits the request to acquire the first restriction information to the information processing apparatus;

a second transmission step of transmitting a request to acquire second restriction information about the user in using said other image processing apparatus in accordance with input in the input step, wherein the second transmission step transmits the request to acquire the second restriction information to the other image processing apparatus;

a control step of completing login of the user to the image processing apparatus in accordance with acquisition of the first restriction information regardless of acquisition of the second restriction information;

a first reception step of receiving the first restriction information from the information processing apparatus;

a second reception step of receiving the second restriction information from the other image processing apparatus;

a determination step of determining whether the image processing apparatus holds the first restriction information;

a value incrementing step of incrementing a value representing a reference count of the first restriction information by one when it is determined that the image processing apparatus holds the first restriction information in the determination step, or when the first restriction information is received in the first reception step;

a value decrementing step of decrementing the value representing the reference count by one when a logout instructions is received from the user;

a second determination step of determining, upon receiving the logout instruction from the user, whether the value representing the reference count is 0; and a deletion step of deleting the held first restriction information or the first restriction information received in the first reception step when it is determined that the value representing the reference count is 0 in the second determination step.

9. A non-transitory computer-readable storage medium storing a computer program, characterized by causing an image processing apparatus for transmitting input image data to another image processing apparatus and causing said other image processing apparatus to process the image data, the image processing apparatus being connected to an information processing apparatus for managing restriction information for each user, to execute:

an input step of inputting authentication information to specify a user;

a first transmission step of transmitting a request to acquire first restriction information about the user in using the image processing apparatus in accordance with input in the input step, wherein the first transmission step transmits the request to acquire the first restriction information to the information processing apparatus;

a second transmission step of transmitting a request to acquire second restriction information about the user in using said other image processing apparatus in accordance with input in the input step, wherein the second transmission step transmits the request to acquire the second restriction information to the other image processing apparatus;

a control step of completing login of the user to the image processing apparatus in accordance with acquisition of the first restriction information regardless of acquisition of the second restriction information;

a first reception step of receiving the first restriction information from the information processing apparatus;

a second reception step of receiving the second restriction information from the other image processing apparatus;

a determination step of determining whether the image processing apparatus holds the first restriction information;

a value incrementing step of incrementing a value representing a reference count of the first restriction information by one when it is determined that the image processing apparatus holds the first restriction information in the determination step, or when the first restriction information is received in the first reception step;

a value decrementing step of decrementing the value representing the reference count by one when a logout instructions is received from the user;

a second determination step of determining, upon receiving the logout instruction from the user, whether the value representing the reference count is 0; and a deletion step of deleting the held first restriction information or the first restriction information received in the first reception step when it is determined that the value representing the reference count is 0 in the second determination step.

* * * * *